United States Patent
Golitschek Edler von Elbwart et al.

(10) Patent No.: US 11,910,397 B2
(45) Date of Patent: Feb. 20, 2024

(54) NOTIFICATION FOR CONFIGURED GRANT-SMALL DATA TRANSMISSION ACTION

(71) Applicant: Lenovo (Singapore) Pte. Ltd., Singapore (SG)

(72) Inventors: Alexander Golitschek Edler von Elbwart, Darmstadt (DE); Joachim Löhr, Wiesbaden (DE); Prateek Basu Mallick, Dreieich (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 155 days.

(21) Appl. No.: 17/528,687

(22) Filed: Nov. 17, 2021

(65) Prior Publication Data

US 2023/0156716 A1    May 18, 2023

(51) Int. Cl.
*H04W 72/23* (2023.01)
*H04L 1/00* (2006.01)
*H04W 68/00* (2009.01)
*H04W 72/044* (2023.01)

(52) U.S. Cl.
CPC ............ *H04W 72/23* (2023.01); *H04L 1/0061* (2013.01); *H04W 68/005* (2013.01); *H04W 72/0466* (2013.01)

(58) Field of Classification Search
CPC .............. H04W 72/23; H04W 68/005; H04W 72/0466; H04W 52/0229; H04W 72/115; H04W 72/1268; H04W 74/0833; H04W 76/27; H04L 1/0061
See application file for complete search history.

(56) References Cited

U.S. PATENT DOCUMENTS

| | | | | |
|---|---|---|---|---|
| 2021/0315049 A1* | 10/2021 | Wei | ............... | H04W 56/0045 |
| 2023/0102937 A1* | 3/2023 | Kim | ............... | H04W 76/30 |
| | | | | 370/329 |
| 2023/0189103 A1* | 6/2023 | Zhang | ............... | H04W 76/27 |
| | | | | 370/331 |

(Continued)

FOREIGN PATENT DOCUMENTS

| | | |
|---|---|---|
| WO | 2020148483 A1 | 7/2020 |
| WO | 2022191492 A1 | 9/2022 |

OTHER PUBLICATIONS

"5G NR Grant Free Dynamic Scheduling—Transmission without Grant", Techplayon [retrieved Nov. 19, 2021]. Retrieved from the Internet <https://www.techplayon.com/5g-nr-grant-free-dynamic-scheduling-transmission-without-grant-twg/>., Oct. 3, 2019, 8 Pages.

(Continued)

*Primary Examiner* — Afshawn M Towfighi
(74) *Attorney, Agent, or Firm* — FIG. 1 Patents

(57) ABSTRACT

Various aspects of the present disclosure relate to generating a notification that instructs a user equipment (UE) to perform a configured grant-small data transmission (CG-SDT) action to cause CG-SDT resources of the UE to be released. A base station generates a notification with an instruction to perform a CG-SDT action and communicates the notification to a UE. The UE receives the instruction and performs the CG-SDT action to release CG-SDT resources allocated to the UE while the UE is in an inactive state.

20 Claims, 11 Drawing Sheets

(56) References Cited

U.S. PATENT DOCUMENTS

2023/0189213 A1* 6/2023 Kim ..................... H04W 72/04
                                                        455/458

OTHER PUBLICATIONS

"5G NR UE Paging", iTecTec [retrieved Nov. 19, 2021]. Retrieved from the Internet <https://itectec.com/spec/5g-nr-ue-paging/>., 5 Pages.

"5G/NR—Frame Structure", Share Tech Notes [retrieved Nov. 19, 2021]. Retrieved from the Internet <https://www.sharetechnote.com/html/5G/5G_FrameStructure.html>., 23 Pages.

"Multiplexing and channel coding", 3rd Generation Partnership Project; Technical Specification Group Radio Access Network, 3GPP TS 38.212 V16.7.0, 3GPP Organizational Partners, Valbonne, France [retrieved Feb. 2, 2022]. Retrieved from the Internet <http://www.3gpp.org>., Sep. 2021, 153 Pages.

"Physical layer procedures for control", 3rd Generation Partnership Project; Technical Specification Group Radio Access Network, 3GPP TS 38.213 V16.7.0, 3GPP Organizational Partners, Valbonne, France [retrieved Feb. 2, 2022]. Retrieved from the Internet <http://www.3gpp.org>., Sep. 2021, 188 Pages.

"Physical layer procedures for data", 3rd Generation Partnership Project; Technical Specification Group Radio Access Network, 3GPP TS 38.214 V16.7.0, 3GPP Organizational Partners, Valbonne, France [retrieved Feb. 2, 2022]. Retrieved from the Internet <http://www.3gpp.org>., Sep. 2021, 172 Pages.

"Radio Resource Control (RRC) protocol specification", 3rd Generation Partnership Project; Technical Specification Group Radio Access Network, 3GPP TS 38.331 V16.6.0, 3GPP Organizational Partners, Valbonne, France [retrieved Feb. 2, 2022]. Retrieved from the Internet <http://www.3gpp.org>., Sep. 2021, 961 Pages.

"User Equipment (UE) procedures in Idle mode and RRC Inactive state (Release 16)", 3rd Generation Partnership Project, Technical Specification Group Radio Access Network, 3GPP TS 38.304 V16.6.0, 3GPP Organizational Partners, Valbonne, France [retrieved Feb. 2, 2022]. Retrieved from the Internet <http://www.3gpp.org>., Sep. 2021, 39 pages.

PCT/US2022/050109 , "International Search Report and Written Opinion", PCT Application No. PCT/US2022/050109, dated Feb. 20, 2023, 15 pages.

Samsung , "Discussion on other issues related to SDT", 3GPP TSG-RAN WG3 Meeting #114e, R3-214884, Online [retrieved Feb. 20, 2023]. Retrieved from the Internet <https://www.3gpp.org/ftp/tsg_ran/WG3_lu/TSGR3_114-e/Docs>., Nov. 2021, 6 Pages.

ZTE , "Discussion on CG based SOT", 3GPP TSG-RAN WG3 #114-e, R3-214846, Online [retrieved Feb. 20, 2023]. Retrieved from the Internet <https://www.3gpp.org/ftp/tsg_ran/WG3_lu/TSGR3_114-e/Docs>., Nov. 2021, 29 Pages.

* cited by examiner

```
                        Paging message
-- ASN1START
-- TAG-PAGING-START

Paging ::=                  SEQUENCE {
    pagingRecordList            PagingRecordList
OPTIONAL, -- Need N
    lateNonCriticalExtension    OCTET STRING
OPTIONAL,
    nonCriticalExtension        SEQUENCE{}
OPTIONAL
}

PagingRecordList ::=        SEQUENCE (SIZE(1..maxNrofPageRec)) OF PagingRecord

PagingRecord ::=            SEQUENCE {
    ue-Identity                 PagingUE-Identity,
    accessType                  ENUMERATED {non3GPP}   OPTIONAL,  -- Need N
    pagingcause                 ENUMERATED{CG-SDT release, SDT-TATexpire}
    ...
}

PagingUE-Identity ::=       CHOICE {
    ng-5G-S-TMSI                NG-5G-S-TMSI,
    fullI-RNTI                  I-RNTI-Value,
    ...
}

-- TAG-PAGING-STOP
-- ASN1STOP
```

FIG. 5

NOTIFICATION FOR CONFIGURED GRANT-SMALL DATA TRANSMISSION ACTION

TECHNICAL FIELD

The present disclosure relates to wireless communications, and more specifically to configuring wireless resources of wireless devices.

BACKGROUND

A wireless communications system may include one or multiple network communication devices, such as base stations, which may be otherwise known as an eNodeB (eNB), a next-generation NodeB (gNB), or other suitable terminology. Each network communication device, such as a base station, may support wireless communications for one or multiple user communication devices, which may be otherwise known as user equipment (UE), or other suitable terminology. The wireless communications system may support wireless communications with one or multiple user communication devices by utilizing resources of the wireless communication system, such as time resources (e.g., symbols, subslots, slots, subframes, frames, or the like) or frequency resources (e.g., subcarriers, carriers). Additionally, the wireless communications system may support wireless communications across various radio access technologies including third generation (3G) radio access technology, fourth generation (4G) radio access technology, fifth generation (5G) radio access technology, and other suitable radio access technologies beyond 5G.

Generally, different techniques are available to allocate wireless resources to UEs for wireless communication. One particular technique utilizes configured grant (CG) resources that represent wireless resources (e.g., carrier resources, periodic uplink resources) that are reserved to a particular UE or set of UEs. A UE, for instance, is able to utilize CG resources for wireless communication between the UE and a wireless network.

SUMMARY

The present disclosure relates to methods, apparatuses, and systems that support notification for configured grant-small data transmission action, such as for enabling a user equipment (UE) to release configured grant-small data transmission (CG-SDT) resources allocated to the UE. For instance, a base station (e.g., a next-generation NodeB (gNB)) determines that CG-SDT resources of a UE are to be released, such as to enable the base station to allocate the resources to other UEs. Accordingly, the base station generates a notification such as downlink control information (DCI) and/or a paging message and includes in the notification an instruction to perform a CG-SDT action. The notification is communicated to a UE and the UE performs the identified action to release CG-SDT resources previously reserved to the UE. Further, after the UE performs the CG-SDT action it may remain in an inactive state. Accordingly, this disclosure facilitates network resource conservation by enabling CG-SDT resources to be released and reallocated, and also facilitates power conservation by enabling UEs to perform CG-SDT actions with the UEs being and remaining in an inactive state, e.g., without transitioning to an active state or idle state.

Some implementations of the methods and apparatuses described herein may further include wireless communication at a device (e.g., UE), which includes receiving from a base station (e.g., gNB) and while the device is in an inactive state, a notification in a form of one or more of downlink control information or a paging message. Further, the notification includes an instruction indicating to perform an action pertaining to CG-SDT functionality of the device. Further, the instruction may include to remain in an inactive state, e.g., not to transition to an active or idle state. The device performs the action according to the instruction as pertaining to the CG-SDT functionality. Further, after performing the action pertaining to CG-SDT functionality the device may remain in an inactive state, e.g., not transition to an active or idle state. The action, for example, includes deactivating or deconfiguring a configured grant configuration of the device, an action pertaining to a timing advance timer, disabling CG-SDT functionality of the device, and so forth.

Some implementations of the methods and apparatuses described herein may further include wireless communication at a base station (e.g., gNB), which includes generating a notification in a form of one or more of downlink control information or a paging message. Further, the notification includes an instruction indicating to perform an action pertaining to CG-SDT functionality of a device. Further, the notification including the instruction may include to remain in an inactive state after performing the action, e.g., not transition to an active or idle state. The base station, for instance, transmits the notification for receipt by a UE while the UE is in an inactive state.

BRIEF DESCRIPTION OF THE DRAWINGS

Various aspects of the present disclosure for notification for configured grant-small data transmission action are described with reference to the following Figures. The same numbers may be used throughout to reference like features and components shown in the Figures.

FIG. 5 illustrates an example paging message that supports notification for configured grant-small data transmission action in accordance with aspects of the present disclosure.

DETAILED DESCRIPTION

Figure 1:
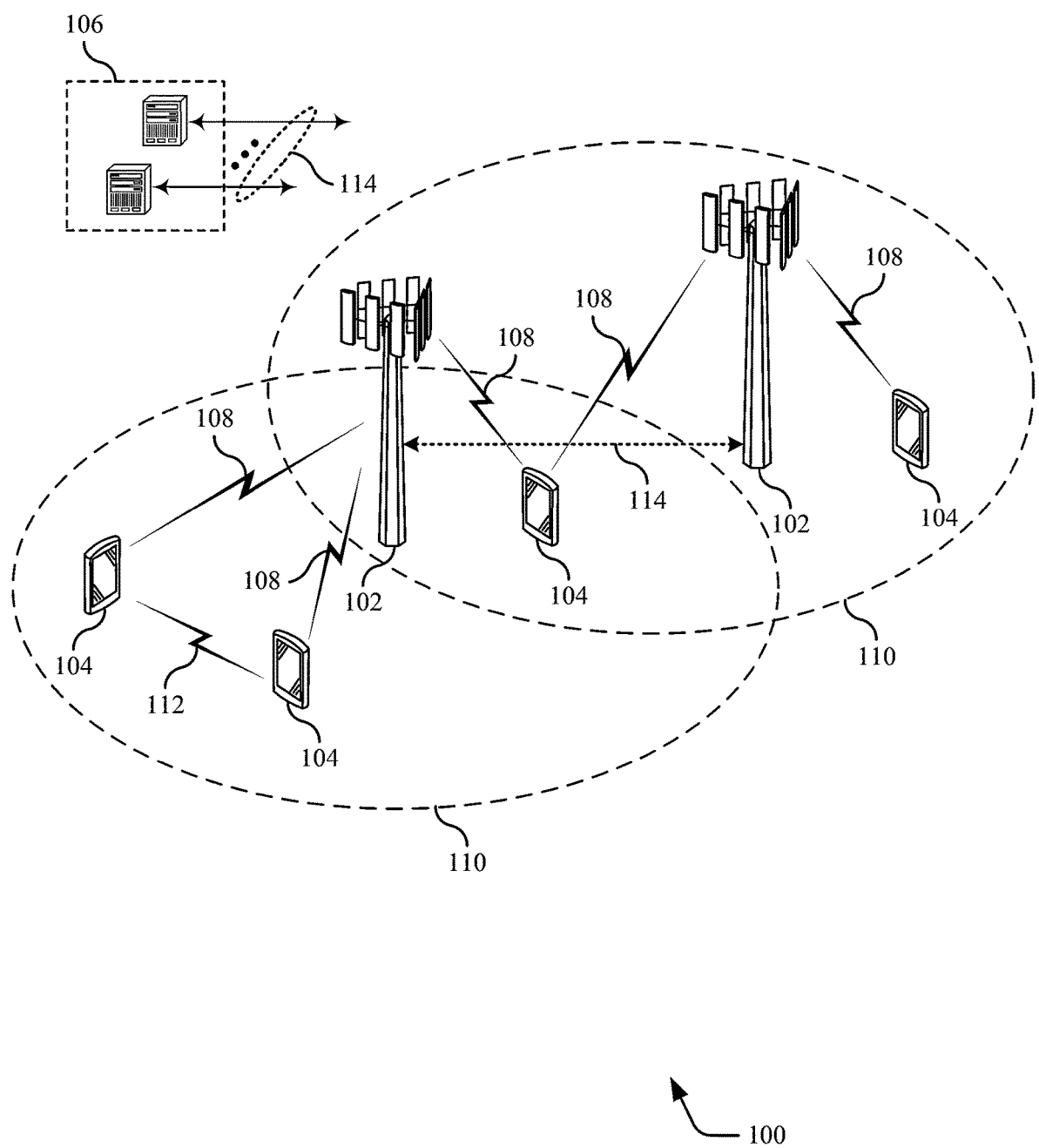
FIG. 1 illustrates an example of a wireless communications system that supports notification for configured grant-small data transmission action in accordance with aspects of the present disclosure.

Implementations of notification for configured grant-small data transmission action are described, such as for enabling configured grant-small data transmission (CG-SDT) resources (e.g., carrier resources, timing resources, etc.) of a user equipment (UE) to be released and made available for reallocation. Generally, this disclosure provides techniques for enabling a base station (e.g., a next-generation NodeB (gNB)) to notify a UE to perform a CG-SDT action to release CG-SDT resources, and the UE is enabled to perform the CG-SDT action while in an inactive state.

Conventional techniques for activating and deactivating CG-SDT resources utilize notification protocols that typically involve UEs being in an active state. For instance, in conventional scenarios where a base station signals a UE to deactivate CG resources, the base station utilizes notification types that cause the UE to transition from an inactive state to an active state. Thus, such conventional techniques are inefficient for purposes of enabling CG-SDT resources to be reallocated as well as from a UE power resource scenario.

Accordingly, aspects of the present disclosure provide that when a base station determines to notify a UE to release CG-SDT resources, the base station generates a notification based on a customized format that identifies a CG-SDT action to be performed. For instance, in at least one implementation a notification is generated via downlink control information (DCI) that includes a Short Message field identifying a CG-SDT action or set of CG-SDT actions, such as deactivating or deconfiguring a CG configuration of a UE, an action pertaining to a timing advance timer of the UE, disabling CG-SDT functionality of the UE, and so forth. In an alternative or additional implementation the notification is generated via a Paging Message that identifies a CG-SDT action or set of CG-SDT actions. The Paging Message, for example, accompanies DCI that identifies the Paging Message.

Accordingly, the base station communicates the notification to a UE and the UE processes the notification to identify a CG-SDT action or set of CG-SDT actions. The UE can execute the CG-SDT action(s) to deactivate CG-SDT resources allocated to the UE, such as wireless carrier resources, transmission timing resources (e.g., assigned CG periodicity), and so forth. Further, the UE can execute the CG-SDT action(s) remaining in an inactive state. For instance, where the UE receives the notification while in an inactive state, logic of the UE indicates that the CG-SDT action(s) are performable while the UE is in the inactive state and may allow the UE to remain in the inactive state after performing the CG-SDT action(s). Thus, the UE can perform the CG-SDT action(s) without transitioning to an active state or idle state.

Thus, aspects of the present disclosure provide for releasing CG-SDT resources assigned to a UE while the UE is and optionally remains in an inactive state. This conserves network resources by enabling CG-SDT resources released by a UE to be reassigned to other UEs by the network. Further, power resources (e.g., battery charge) of a UE are conserved by enabling the UE to release CG-SDT resources while being and optionally remaining in an inactive state, e.g., without transitioning to an active state or idle state.

Aspects of the present disclosure are described in the context of a wireless communications system. Aspects of the present disclosure are further illustrated and described with reference to device diagrams and flowcharts that relate to notification for configured grant-small data transmission action.

FIG. 1 illustrates an example of a wireless communications system 100 that supports notification for configured grant-small data transmission action in accordance with aspects of the present disclosure. The wireless communications system 100 may include one or more base stations 102, one or more UEs 104, and a core network 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a 5G network, such as an NR network. In other implementations, the wireless communications system 100 may be a combination of a 4G network and a 5G network. The wireless communications system 100 may support radio access technologies beyond 5G. Additionally, the wireless communications system 100 may support technologies, such as time division multiple access (TDMA), frequency division multiple access (FDMA), or code division multiple access (CDMA), etc.

The one or more base stations 102 may be dispersed throughout a geographic region to form the wireless communications system 100. One or more of the base stations 102 described herein may be or include or may be referred to as a base transceiver station, an access point, a NodeB, an eNodeB (eNB), a next-generation NodeB (gNB), or other suitable terminology. A base station 102 and a UE 104 may communicate via a communication link 108, which may be a wireless or wired connection. For example, a base station 102 and a UE 104 may perform wireless communication over a Uu interface.

A base station 102 may provide a geographic coverage area 110 for which the base station 102 may support services (e.g., voice, video, packet data, messaging, broadcast, etc.) for one or more UEs 104 within the geographic coverage area 110. For example, a base station 102 and a UE 104 may support wireless communication of signals related to services (e.g., voice, video, packet data, messaging, broadcast, etc.) according to one or multiple radio access technologies. In some implementations, a base station 102 may be moveable, for example, a satellite associated with a non-terrestrial network. In some implementations, different geographic coverage areas 110 associated with the same or different radio access technologies may overlap, but the different geographic coverage areas 110 may be associated with different base stations 102. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The one or more UEs 104 may be dispersed throughout a geographic region of the wireless communications system 100. A UE 104 may include or may be referred to as a mobile device, a wireless device, a remote device, a handheld device, or a subscriber device, or some other suitable terminology. In some implementations, the UE 104 may be referred to as a unit, a station, a terminal, or a client, among other examples. Additionally, or alternatively, the UE 104 may be referred to as an Internet-of-Things (IoT) device, an Internet-of-Everything (IoE) device, or machine-type communication (MTC) device, among other examples. In some implementations, a UE 104 may be stationary in the wireless communications system 100. In some other implementations, a UE 104 may be mobile in the wireless communications system 100.

The one or more UEs 104 may be devices in different forms or having different capabilities. Some examples of UEs 104 are illustrated in FIG. 1. A UE 104 may be capable of communicating with various types of devices, such as the base stations 102, other UEs 104, or network equipment (e.g., the core network 106, a relay device, an integrated access and backhaul (IAB) node, or another network equipment), as shown in FIG. 1. Additionally, or alternatively, a UE 104 may support communication with other base stations 102 or UEs 104, which may act as relays in the wireless communications system 100.

A UE 104 may also be able to support wireless communication directly with other UEs 104 over a communication link 112. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link 112 may be referred to as a sidelink. For example, a UE 104 may support wireless communication directly with another UE 104 over a PC5 interface.

A base station 102 may support communications with the core network 106, or with another base station 102, or both. For example, a base station 102 may interface with the core network 106 through one or more backhaul links 114 (e.g., via an S1, N2, N2, or another network interface). The base stations 102 may communicate with each other over the backhaul links 114 (e.g., via an X2, Xn, or another network interface). In some implementations, the base stations 102 may communicate with each other directly (e.g., between the base stations 102). In some other implementations, the base stations 102 may communicate with each other indirectly (e.g., via the core network 106). In some implementations, one or more base stations 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The core network 106 may support user authentication, access authorization, tracking, connectivity, and other access, routing, or mobility functions. The core network 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management for the one or more UEs 104 served by the one or more base stations 102 associated with the core network 106.

In at least one implementation one or more of the UEs 104 and/or one or more of the base stations 102 are operable to implement various aspects of notification for configured grant-small data transmission action described herein. For instance, leveraging the described techniques, a base station 102 is operable to communicate with a particular UE 104 while the UE 104 is in an inactive state and to instruct the particular UE 104 to perform an action such as deactivating and/or deconfiguring an activated CG uplink configuration, an action affecting a timing advance timer (TAT), disabling functionality for CG-SDT, and so forth. Further, the UE 104 is operable to perform the action(s) while being in an inactive state and optionally remaining in an inactive state after performing the action(s).

Configured Grant Resources

The ability to engage in small data transmission (SDT) enables a UE to transmit packets of data that are below a specified data volume while in an inactive state, e.g., radio resource control inactive (e.g., RRC_INACTIVE). Staying in RRC_INACTIVE has benefits within the network side of the communication system and the UE, since a transition to an active state (e.g., radio resource control active (RRC_CONNECTED) and the accompanying message exchange can be avoided. Generally, two different tracks are available for transmitting data using SDT, including via configured grant resources and through a random access channel (RACH) procedure.

Configured grant (CG) resources represent wireless communication resources (e.g., air interface resources) that are provided by a base station to a UE. For instance, to set up CG functionality of a UE, a base station communicates radio resource control (RRC) information that specifies CG resources to the UE and independent of a resource request from the UE. The UE can then utilize the CG resources for wireless data transmission such as for SDT. Generally, utilizing CG resources can avoid handshake delay that occurs when a UE requests wireless resources, e.g., when a UE sends a scheduling request and waits for UL grant allocation.

For instance, consider a scenario where a UE that has been configured with CG resources has data to transmit to a base station while in an inactive state. To determine whether the data is transmittable via an SDT and utilizing CG resources, a data volume of the data is compared to a threshold data volume specified for SDT transmissions. Further, a reference signal received power (RSRP) at the UE is compared to a threshold RSRP. If the data volume is below the threshold data volume and the RSRP is above the threshold RSRP, the UE determines if a current timing alignment (TA) is considered to be valid, e.g., if a Timing alignment Timer (TAT) applicable to CG-SDT transmissions is running. The validity of the TA may be determined according to other or additional criteria than a running TA. For example, if the UE detects an abrupt change in path loss, the UE may consider the TA to be invalid. A TA, for example, represents uplink transmission timing information communication from a base station to the UE. The uplink timing alignment (TA), for instance, represents an offset value that is utilized at a UE between a start of a received downlink subframe and a transmitted uplink subframe. In at least one implementation a TA is provided to a UE by a base station based on measurements of timing of uplink signals from the UE, e.g. by means of a TA command. Generally, by transmitting data according to a valid TA, data transmission from the UE aligns with subframe timing at the base station. Accordingly, if the TA is valid, the UE can proceed with attempting to transmit the data via an SDT and utilizing CG resources. Otherwise, if the data volume is above the threshold data volume and/or the RSRP is below the threshold RSRP, or if a valid TA is not detected, the UE can utilize a RACH procedure for transmitting the data, e.g. transition to RRC_CONNECTED mode for data transmission or performing RACH-SDT.

Currently, activation and deactivation of CG functionality of a UE utilizes an activation/deactivation command for uplink (UL) that is transmitted from a base station to the UE and processed by the UE by means of a downlink control information (DCI) communication (CG type 2) or utilizing an RRC message (CG type 1). The configuration of CG resources is typically done using RRC signaling. For instance, CG Type 1 deactivation involves reception of a deactivation DCI (Type 2) and CG Type 2 deactivation involves reception of an RRC message releasing the CG resource at a UE. Further, as part of receiving and processing these notification types, a UE is placed in RRC_CONNECTED state. Accordingly, in conventional techniques, to prevent a UE in an RRC_INACTIVE from using a specific activated CG resource, the UE is instructed to enter an RRC_CONNECTED state by means of a Paging message, followed by receiving and processing the DCI communication or the RRC message to deactivate and/or release the CG resource while in the RRC_CONNECTED state, and the UE may then subsequently be sent to RRC_INACTIVE state.

Communication Procedures

A variety of different communication procedures are available for communicating instructions to a UE, such as when the UE is in an inactive state. Generally, as part of using the described communication techniques, a UE may use Discontinuous Reception (DRX) in RRC IDLE and RRC_INACTIVE states, such as to reduce power consumption. For instance, a UE monitors one paging occasion (PO) per DRX cycle and a PO is a set of physical downlink control channel (PDCCH) monitoring occasions that can consist of multiple time slots (e.g., subframe or orthogonal frequency-division multiplexing (OFDM) symbol) where a paging DCI can be sent. Further, one Paging Frame (PF) is one Radio Frame and may contain one or multiple PO(s) or a starting point of a PO. Accordingly, a PO or set of POs determined from a PF can be utilized to communicate notifications from a base station to a UE.

For instance, a base station communicates a notification to a UE and the UE detects the notification as part of a monitored PO. Further, the notification can take various forms such as a DCI format with information included in a Short Messages field and/or a DCI format with an accompanying Paging Message that includes information to be communicated to the UE. In scenarios that utilize the DCI format with a Short Messages field, a Short Message indicator is utilized to specify whether a Short Message is included with the DCI. Further, a Short Message is formatted to include preconfigured bits and reserved bits. In scenarios that utilize the DCI format with an accompanying Paging Message, a Transport Block of the DCI format includes a Paging Message that is utilizable to communicate information to a UE.

Notification for Configured Grant-Small Data Transmission Action

In aspects of the present disclosure, techniques are described to enable release of CG resources of a UE while the UE is in an inactive state. For instance, the described techniques enable a base station (e.g., a gNB) to determine that CG-SDT resources of a UE and/or group of UEs are to be released, and to notify the UE(s) to release their CG-SDT resources without causing the UE(s) to transition to an active state. In at least some implementations the base station utilizes a DCI format with information included in a Short Messages field and/or a DCI format with an accompanying Paging Message to notify a UE to release its CG resources.

Figure 2:
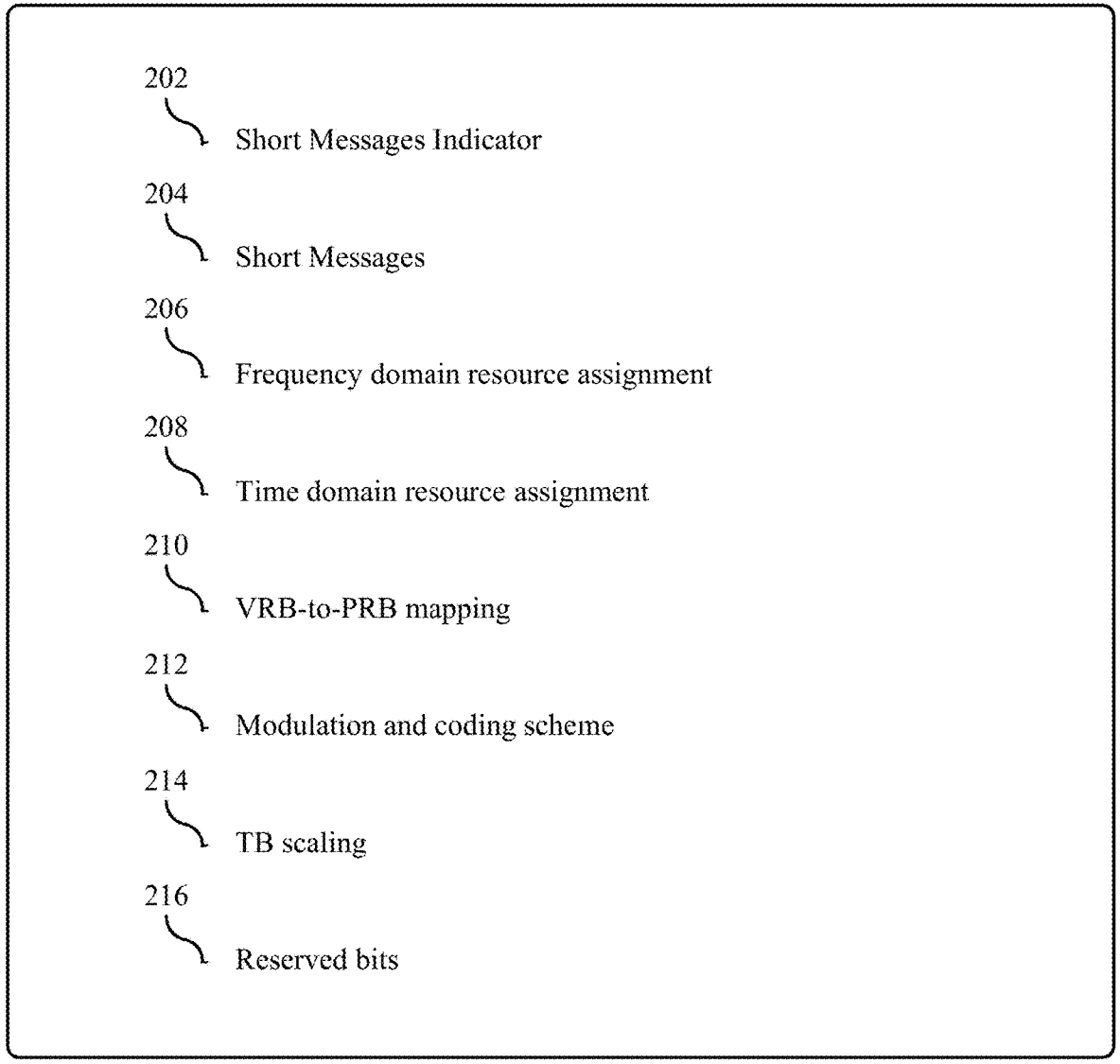
FIG. 2 illustrates an example of a notification that supports notification for configured grant-small data transmission action in accordance with aspects of the present disclosure.

FIG. 2 illustrates an example of a notification 200 that supports notification for configured grant-small data transmission action in accordance with aspects of the present disclosure. In this particular example the notification 200 is in the DCI format 1_0 with cyclic redundancy check (CRC) scrambled by Paging-Radio Network Temporary Identifier (P-RNTI). Generally, the P-RNTI represents an identifier that is used to identify a particular DCI message as being related to paging and being read generally by all UEs in a cell and/or a group of UEs; however it is usually expected that not all UEs are looking for such a DCI message at the same time, but only during preconfigured paging occasions (POs). Further, the notification 200 includes fields that are utilizable to communicate various aspects of the described techniques including a Short Message Indicator (SMI) field 202, a Short Message (SM) field 204, a Frequency Domain Resource Assignment (FDRA) field 206, a Time Domain Resource Assignment (TDRA) field 208, a Virtual Resource Block to Physical Resource Block (VRB-PRB) mapping field 210, a Modulation and Coding Scheme field 212, a transport block (TB) scaling field 214, and a Reserved Bits field 216.

The SMI field 202 is configurable to indicate whether a Short Message is included with the notification 200. Further details concerning the SMI field 202 are presented below. The SM field 204 is configurable to include a Short Message that includes an action or set of actions to be performed by a UE to affect CG configuration of the UE. In at least one implementation the SM field 204 is configured to contain 8 bits. Example attributes of a Short Message that can be included in the SMI field 204 are detailed below. The FDRA field 206 is configurable with identifiers for resource blocks (RBs) and the corresponding bandwidth part (BWP) on which a UE can transmit and receive data. In an implementation the FDRA field 206 utilizes from 9 to 16 bits as defined in Clause 5.1.2.2 of 3GPP TS 38.214 [6]. If only a Short Message is carried by the notification 200, this bit field is reserved. The TDRA field 208 is configurable to indicate time domain resources to be assigned. In at least one implementation the TDRA field utilizes 4 bits as defined in Clause 5.1.2.1 of 3GPP TS 38.214 [6]. If only a short message is carried by the notification 200, this bit field is reserved.

The VRB-PRB mapping field 210 maps virtual resource blocks to physical resource blocks allocated to a UE. In at least one implementation this field utilizes 1 bit according to 3GPP TS 38.212 Table 7.3.1.2.2-5. If only the short message is carried, this bit field is reserved. The Modulation and Coding Scheme field 212 identifies a modulation and coding scheme to be utilized by a UE. In at least one implementation this field utilizes 5 bits as defined in Clause 5.1.3 of 3GPP TS38.214, using Table 5.1.3.1-1. If only the short message is carried, this bit field is reserved. The TB Scaling field 214 sets the transport block size based on a scaling factor. In at least one implementation this field utilizes 2 bits as defined in Table 5.1.3.2 of 3GPP TS 38.214 [6]. If only a Short Message is carried, this bit field is reserved.

The Reserved Bits field 216 represents reserved bits that can be used for various purposes, such as UE identification for a UE or group of UEs to which the notification 200 is targeted. In at least one implementation this field utilizes 8 bits for operation in a cell with shared spectrum channel access, otherwise 6 bits.

According to various implementations the notification 200 includes an identifier for a UE and/or group of UEs to which the notification 200 is addressed. For instance, if only a Short Message is carried by the notification 200, the FDRA field 206 can be configured with a UE/UE group identifier. Alternatively, or additionally the Reserved Bits field 216 can be configured with a UE/UE group identifier. Accordingly, when a UE receives the notification 200 the UE checks its own preconfigured identifier value with an identifier specified by the notification 200. If the preconfigured identifier of the UE matches an identifier specified in the notification 200, the UE can perform a CG-SDT action specified in the notification 200, such as in a Short Message in the SM field 204. If the preconfigured identifier of the UE does not match an identifier specified in the notification 200, the UE can ignore the notification 200, e.g., not perform a CG-SDT action specified in the notification 200. Generally, using a group UE identifier enables multiple UEs to be addressed with a single instance of the notification 200. In at least one implementation a UE identifier and/or UE group identifier can be assigned to a UE and/or group of UEs, such as an in a Radio Resource Control Release (RRCRelease) message sent from a base station. For instance, a base station can generate a BITMAP of 4 bits with each bit indicating a sub-group of UEs. UEs in each group can be assigned to a particular bit value and the BITMAP can be included in the notification 200 with particular bit of the BITMAP set to identify a particular UE or UE group to which the notification 200 is addressed. For instance, a UE that receives the notification 200 checks the BITMAP values to see if a particular SET bit of the BITMAP corresponds to a UE group in which the UE is assigned. If the SET bit corresponds to the UE's group, the UE can perform a CG-SDT action identified in the notification 200. If the SET bit does not correspond to the UE's group, the UE can ignore a CG-SDT action identified in the notification 200.

Figure 3:
FIG. 3 illustrates a table that includes different bit values and corresponding indicators for a Small Message Indicator field that supports notification for configured grant-small data transmission action in accordance with aspects of the present disclosure.

FIG. 3 depicts a table 300 that includes different bit values and corresponding indicators for the SMI field 202. The bit values indicated in the table 300, for instance, identify status information for the notification 200. A bit field 302 (bit value "00") is a reserved bit value and a bit field 304 (bit value "01") indicates that a corresponding DCI includes only scheduling information for Paging, such as to enable a UE to read a Paging Message sent by a base station. A bit field 306 (bit value "10") indicates that only a Short Message is present in a corresponding DCI, e.g., the DCI does not include scheduling information for Paging. A bit field 308 (bit value "11") indicates that both scheduling information for Paging and a Short Message are present in the DCI. Accordingly, the SMI field 202 is configurable with an instance of the specified bit values to identify a status of a respective DCI, such as to indicate whether the DCI includes scheduling information for Paging and/or a Short Message.

Figure 4:
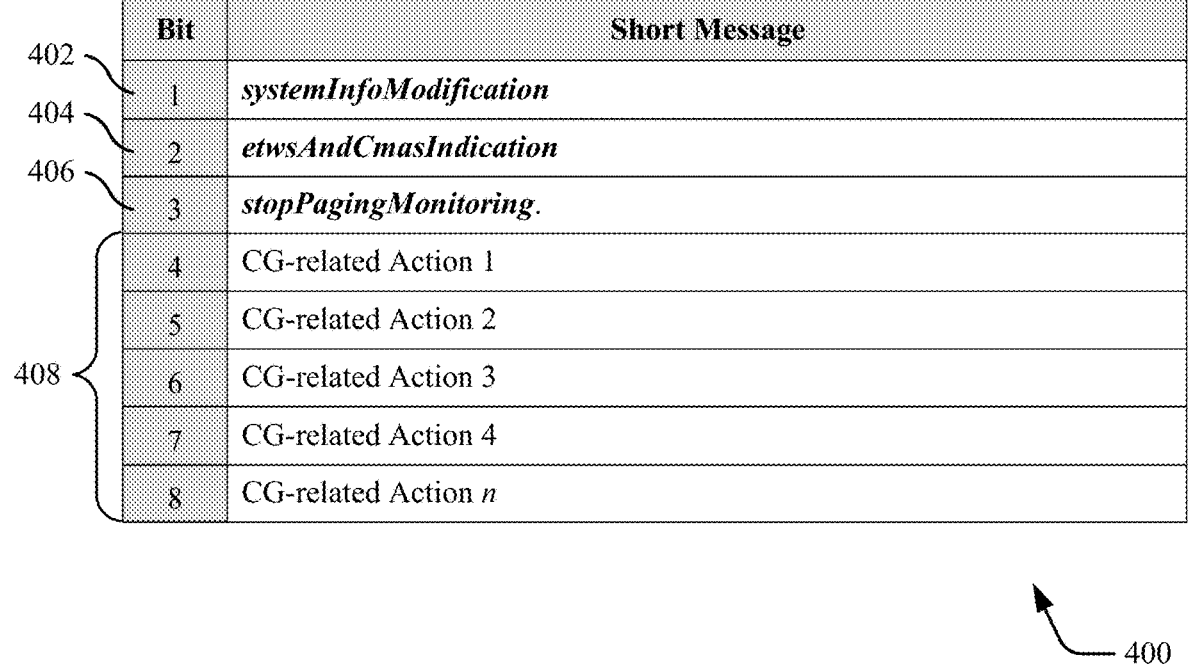
FIG. 4 illustrates an example short message that supports notification for configured grant-small data transmission action in accordance with aspects of the present disclosure.

FIG. 4 depicts an example short message 400 that can be utilized in conjunction with a DCI such as to instruct a UE to perform an action pertaining to CG-SDT configuration. In at least one implementation the short message 400 represents a novel extension of the Short Message format specified in 3GPP TS 38.331, clause 6.5. The short message 400, for example, is populatable to the SM field 204 of the notification 200. The short message 400 includes different bit positions that specify different states and/or actions for a UE. A bit position 402 is configurable to be set to 1 to indicate whether a modification to a modification to a broadcast control channel (BCCH) occurs. For instance, a modification to a BCCH other than a system information block 6 (SIB6), SIB7, and SIB8.

A bit position 404 is configurable to be set to 1 to indicate whether the short message 400 represents an earthquake and tsunami warning system (ETWS) primary notification, an ETWS secondary notification, and/or a Commercial Mobile Alert Service (CMAS) notification. A bit position 406 is usable in conjunction with operation with shared spectrum channel access and if nrofPDCCH-MonitoringOccasion-PerSSB-InPO is present. For instance, if the bit position 406 is set to 1 this indicates that indication that a UE may stop monitoring PDCCH occasion(s) for paging in a current Paging Occasion, such as specified in 3GPP TS 38.304 [20], clause 7.1.

The short message 400 further includes bit positions 408 that are usable to specify a particular CG-SDT action and/or set of actions to be performed in accordance with the various techniques described herein. For instance, an individual bit position 408 is associated with a particular CG-SDT action or set of actions such as deactivating or deconfiguring a CG configuration of a UE, an action pertaining to a timing advance timer of the UE, disabling CG-SDT functionality of the UE, and so forth. For instance, if the bit value of the bit position 408 is set to 1, a corresponding CG-SDT action is specified to be performed by a UE. Generally, a single bit position 408 is usable and/or a set of bit positions 408 are usable to provide for a variety or plurality of different CG-SDT actions. For instance, a subset of the bit positions 408 are usable to specify a CG-SDT action or set of CG-SDT actions while others of the bit positions 408 are unused (e.g., reserved) or are utilized for other non-CG-SDT purposes. In an implementation, multiple CG-SDT actions are indicated by setting multiple bit values to 1 at the corresponding bit positions.

In at least one implementation each of the bit positions 408 is pre-determined as being associated with one or more respective CG-SDT action(s). Logic of a receiving UE, for example, is preconfigured to recognize that a particular bit position 408 is associated with a specific CG-SDT action. The 3GPP TS, for instance, includes definitions that associate a specific CG-SDT action with a particular bit position 408. Alternatively, or additionally, association of a CG-SDT action with a bit position 408 is dynamically configurable. For instance, when a base station activates CG-SDT functionality of a UE and provides CG resources to the UE (e.g., utilizing RRC Configuration), the base station provides mapping information that identifies bit positions 408 and CG-SDT actions associated with each bit position 408. Accordingly, when the base station communicates an instance of the short message 400 to the UE with a particular bit position 408 and/or set of bit positions 408 set (e.g., set to 1) to indicate a CG-SDT action to be performed, the UE is able to utilize the mapping information to determine which CG-SDT action(s) to perform. In at least one implementation the mapping information can be utilized across multiple CG-SDT activation/deactivation processes, and/or can be refreshed (e.g., reconfigured) at different CG-SDT activations. In another implementation, a combination of bit positions 408 and values is pre-determined as being associated with a respective CG-SDT action. For example assuming two bit positions 408 are being employed, a first value combination is associated with a first CG-SDT action or a first set of CG-SDT actions, a second value combination is associated with a second CG-SDT action or a second set of CG-SDT actions, a third value combination is associated with a third CG-SDT action or a third set of CG-SDT actions, and a fourth value combination is associated with a fourth CG-SDT action or a fourth set of CG-SDT actions.

FIG. 5 depicts an example paging message 500 that can be utilized to communicate CG-SDT instructions to a UE in accordance with one or more implementations. In at least one implementation the paging message 500 represents a novel extension of the RRC Paging message specified in 3GPP TS 38.331, subclause 6.2.2. The paging message 500 includes various fields that specifies information pertaining to the paging message 500. A Paging Sequence field 502 identifies a list of sequence of Paging Records included with the paging message 500. For instance, the paging message 500 can include multiple Paging Records that each include discrete sets of information to be communicated to a UE. Optional fields 504 represent optional information to the paging message 500, such as identified extensions to the paging record message 500.

A Paging Record List field 506 is configurable to include a sequence size of a Paging Record List of Paging Records included with the paging message 500. A Paging Record field 508 represents an instance of a Paging Record included with the paging message 500 and includes a UE-Identity field 510 and a Paging Cause field 512. The UE-Identity field 510 is configurable to receive an identifier for an instance of a UE. The Paging Record field 508, for example, represents a discrete instance of a Paging Record that is directed to a specific instance of a UE identified via the UE-Identity field 510.

The Paging Cause field 512 is configurable to receive a CG-SDT action or set of actions to be performed by the UE identified in the UE-Identity field 510. Examples of different CG-SDT actions are described throughout. Generally, a CG-SDT action can be identified in the Paging Cause field 512 in various ways. For instance, an enumerated value that represents a CG-SDT action or set of actions can be populated to the Paging Cause field 512. Alternatively or additionally a Boolean operator associated with a CG-SDT action or set of actions can be populated to the Paging Cause field 512 and if the Boolean operator evaluates as true, the CG-SDT action or set of actions can be performed by a receiving UE. A PagingUE-Identity field 514 is configured to receive specific types of identifiers for identifying a UE as part of network communications. The PagingUE-Identity field 514, for instance, is configured to be populated with a Serving Temporary Mobile Subscriber Identity (S-TMSI) or an Inactive RNTI (I-RNTI) assigned to a particular UE.

Accordingly, utilizing the paging message 500 with a CG-SDT action or set of actions populated to the Paging Cause field 512, a UE can be notified of the CG-SDT action(s) to be performed. Further, the CG-SDT action(s) can be performed by the UE without requiring the UE to transition to an active state (RRC_CONNECTED), e.g., while the UE is in an inactive state. For instance, paging logic of the UE indicates that if a Paging Message that includes a CG-SDT action is received while the UE is in an inactive state, the UE is to remain in the inactive state in conjunction with performing the action and any legacy actions with respect to responding to a Paging message are not undertaken. This kind of Paging is also unique for a Radio Access Node like gNB since it generates the Paging message for a new reason, e.g., to send a CG-SDT instruction so as to trigger one or more UEs to take a CG-SDT action. In legacy implementations, a gNB would typically only trigger generation of a Paging message due to an update of System Information. Determining when the gNB is to send a CG-SDT instruction (e.g., to trigger one or more UEs to take a CG-SDT action) can be depend on a radio resource situation e.g., the available physical resources for scheduling UEs in a cell become limited in availability (i.e., below a certain percentage threshold of resources), when the target UE(s) are no longer using the CG resources for a pre-determined time period, etc.

In at least one implementation, to enable a UE to access and read the paging message 500, the SMI field 202 of a DCI that accompanies the paging message 500 is configured with scheduling information for Paging. Further, the FDRA field 206 of the DCI is configurable to identify where to locate data for a transport block that carries the paging message 500.

Figure 6:
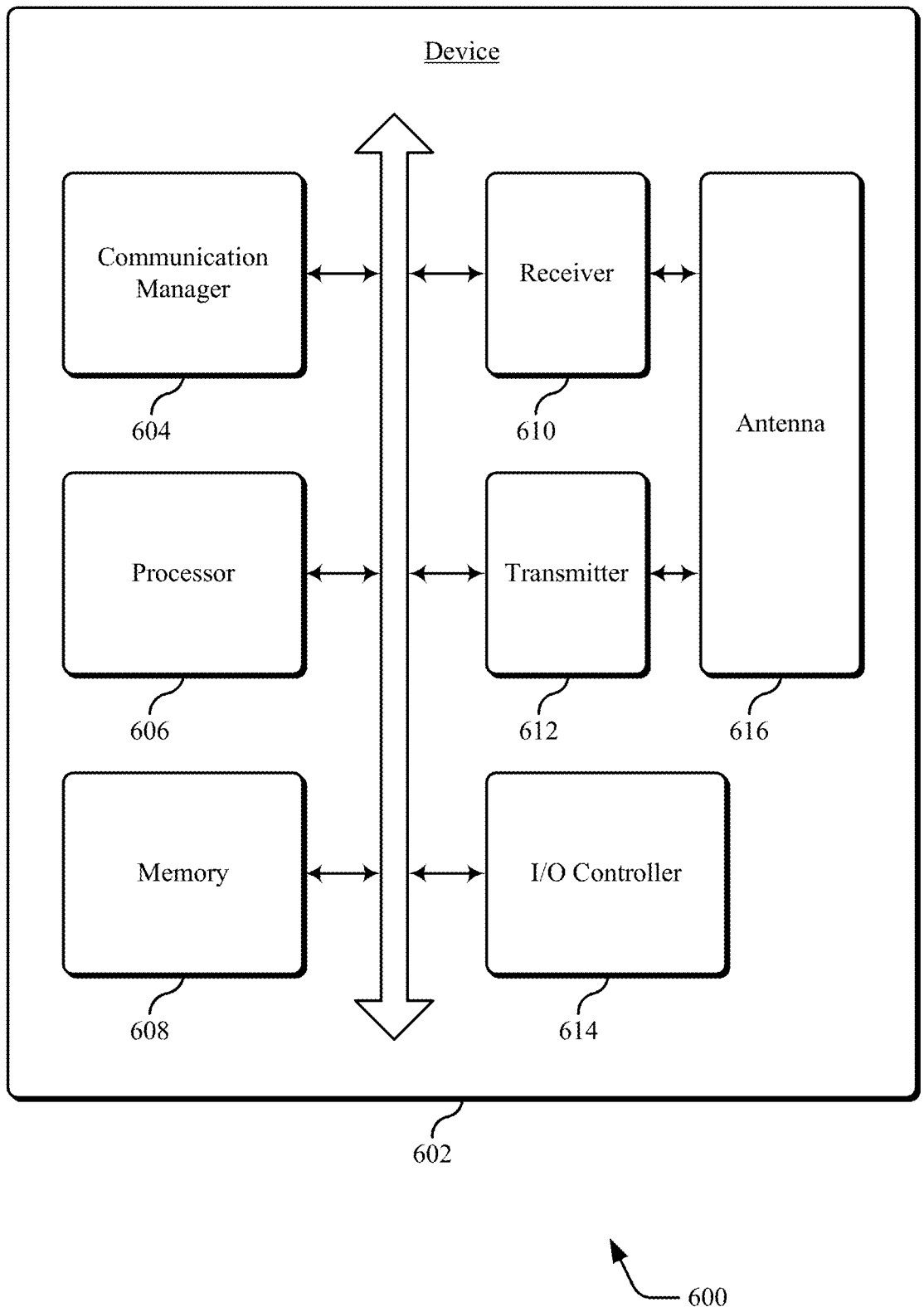
FIG. 6 illustrates an example block diagram of components of a device that supports notification for configured grant-small data transmission action in accordance with aspects of the present disclosure.

FIG. 6 illustrates an example of a block diagram 600 of a device 602 that supports notification for configured grant-small data transmission action in accordance with aspects of the present disclosure. The device 602 may be an example of a user equipment (UE) 104 as described herein. The device 602 may support wireless communication with one or more base stations 102, UEs 104, or any combination thereof. The device 602 may include components for bi-directional communications including components for trans-mitting and receiving communications, such as a communication manager 604, a processor 606, a memory 608, a receiver 610, a transmitter 612, and an I/O controller 614. These components may be in electronic communication or otherwise coupled (e.g., operatively, communicatively, functionally, electronically, electrically) via one or more inter-faces (e.g., buses).

The communication manager 604, the receiver 610, the transmitter 612, or various combinations thereof or various components thereof may be examples of means for performing various aspects of the present disclosure as described herein. For example, the communication manager 604, the receiver 610, the transmitter 612, or various combinations or components thereof may support a method for performing one or more of the functions described herein.

In some implementations, the communication manager 604, the receiver 610, the transmitter 612, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 606 and the memory 608 coupled with the processor 606 may be configured to perform one or more of the functions described herein (e.g., by executing, by the processor 606, instructions stored in the memory 608).

Additionally or alternatively, in some implementations, the communication manager 604, the receiver 610, the transmitter 612, or various combinations or components thereof may be implemented in code (e.g., as communications management software or firmware) executed by the processor 606. If implemented in code executed by the processor 606, the functions of the communication manager 604, the receiver 610, the transmitter 612, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the communication manager 604 may be configured to perform various operations (e.g., receiving, monitoring, transmitting) using or otherwise in cooperation with the receiver 610, the transmitter 612, or both. For example, the communication manager 604 may receive information from the receiver 610, send information to the transmitter 612, or be integrated in combination with the receiver 610, the transmitter 612, or both to receive information, transmit information, or perform various other operations as described herein. Although the communication manager 604 is illustrated as a separate component, in some implementations, one or more functions described with reference to the communication manager 604 may be supported by or performed by the processor 606, the memory 608, or any combination thereof. For example, the memory 608 may store code, which may include instructions executable by the processor 606 to cause the device 602 to perform various aspects of the present disclosure as described herein, or the processor 606 and the memory 608 may be otherwise configured to perform or support such operations.

For example, the communication manager 604 may support wireless communication at a first device (e.g., the device 602) in accordance with examples as disclosed herein. The communication manager 604 and/or other device components may be configured as or otherwise support a means for wireless communication at a device, including receiving, while a device is in an inactive state, a notification in a form of one or more of downlink control information or a paging message, the notification including an instruction indicating to perform an action pertaining to configured grant-small data transmission functionality of the device while being in the inactive state; and performing the action according to the instruction as pertaining to the configured grant-small data transmission functionality while the device is in the inactive state; and optionally remaining in the inactive state after performing the action, e.g., not transitioning to an active or idle state.

Additionally, wireless communication at the device includes any one or combination of: where the notification includes downlink control information with cyclical redundancy check information scrambled by a paging radio network temporary identifier, and where the action is identified in a short message field of the downlink control information; where the notification includes downlink control information with cyclical redundancy check information scrambled by a paging radio network temporary identifier, the action is identified in a short message field of the downlink control information, and where the downlink control information includes one or more of a device identifier for the device or a group identifier for a group that includes the device; where the notification includes the paging message in downlink control information with cyclical redundancy check information scrambled by a paging radio network temporary identifier, and where the action is identified in the paging message; where the action includes one or more of deactivating or deconfiguring a configured grant configuration of the device; where the action includes an action pertaining to a timing advance timer of the device including one or more of stopping the timing advance timer, expiring the timing advance timer, or invalidating the timing advance timer; where the action includes disabling the configured grant-small data transmission functionality of the device; where said receiving the notification includes receiving the notification as the downlink control information with a short message field, the method further including: receiving configuration information that identifies one or more actions pertaining to configured grant-small data transmission functionality of the device and one or more short message bit positions associated with the one or more actions; and identifying the action pertaining to configured grant-small data transmission functionality of the device based on correlating one or more bit positions of the short message field with the configuration information.

Additionally, a device for wireless communication includes a transceiver to receive a notification in a form of one or more of downlink control information or a paging message, the notification including an instruction indicating to perform an action pertaining to configured grant-small data transmission functionality of a device while being in an inactive state; and a communication manager configured to perform the action according to the instruction as pertaining to the configured grant-small data transmission functionality while the device is in the inactive state; and optionally the device remains in an inactive state after performing the action(s).

Additionally, the device for wireless communication includes any one or combination of: where the notification includes the downlink control information, and where the communication manager is configured to identify the instruction to perform the action from a short message field included in the downlink control information; where the notification includes the paging message received from a radio access network, and where the communication manager is configured to identify the instruction to perform the action from an information element included in the paging message; where to perform the action includes to cause configured grant-small data transmission functionality of the device to be at least temporarily unavailable, where the communication manager is further implemented to: determine that a small data transmission is to be transmitted by the device; and implement a random access channel procedure for the small data transmission based on to determine that the configured grant-small data transmission functionality is at least temporarily unavailable. A temporary unavailability may last for example until the device receives a further a notification, or until a UE has received a configuration enabling a configured grant-small data transmission functionality, until a UE is (re-)starting or resetting a timing advance timer, etc.

The processor 606 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 606 may be configured to operate a memory array using a memory controller. In some other implementations, a memory controller may be integrated into the processor 606. The processor 606 may be configured to execute computer-readable instructions stored in a memory (e.g., the memory 608) to cause the device 602 to perform various functions of the present disclosure.

The memory 608 may include random access memory (RAM) and read-only memory (ROM). The memory 608 may store computer-readable, computer-executable code including instructions that, when executed by the processor 606 cause the device 602 to perform various functions described herein. The code may be stored in a non-transitory computer-readable medium such as system memory or another type of memory. In some implementations, the code may not be directly executable by the processor 606 but may cause a computer (e.g., when compiled and executed) to perform functions described herein. In some implementations, the memory 608 may include, among other things, a basic I/O system (BIOS) which may control basic hardware or software operation such as the interaction with peripheral components or devices.

The I/O controller 614 may manage input and output signals for the device 602. The I/O controller 614 may also manage peripherals not integrated into the device 602. In some implementations, the I/O controller 614 may represent a physical connection or port to an external peripheral. In some implementations, the I/O controller 614 may utilize an operating system such as iOS®, ANDROID®, MS-DOS®, MS-WINDOWS®, OS/2®, UNIX®, LINUX®, or another known operating system. In some implementations, the I/O controller 614 may be implemented as part of a processor, such as the processor 606. In some implementations, a user may interact with the device 602 via the I/O controller 614 or via hardware components controlled by the I/O controller 614.

In some implementations, the device 602 may include a single antenna 616. However, in some other implementations, the device 602 may have more than one antenna 616, which may be capable of concurrently transmitting or receiving multiple wireless transmissions. The receiver 610 and the transmitter 612 may communicate bi-directionally, via the one or more antennas 616, wired, or wireless links as described herein. For example, the receiver 610 and the transmitter 612 may represent a wireless transceiver and may communicate bi-directionally with another wireless transceiver. The transceiver may also include a modem to modulate the packets, to provide the modulated packets to one or more antennas 616 for transmission, and to demodulate packets received from the one or more antennas 616.

Figure 7:
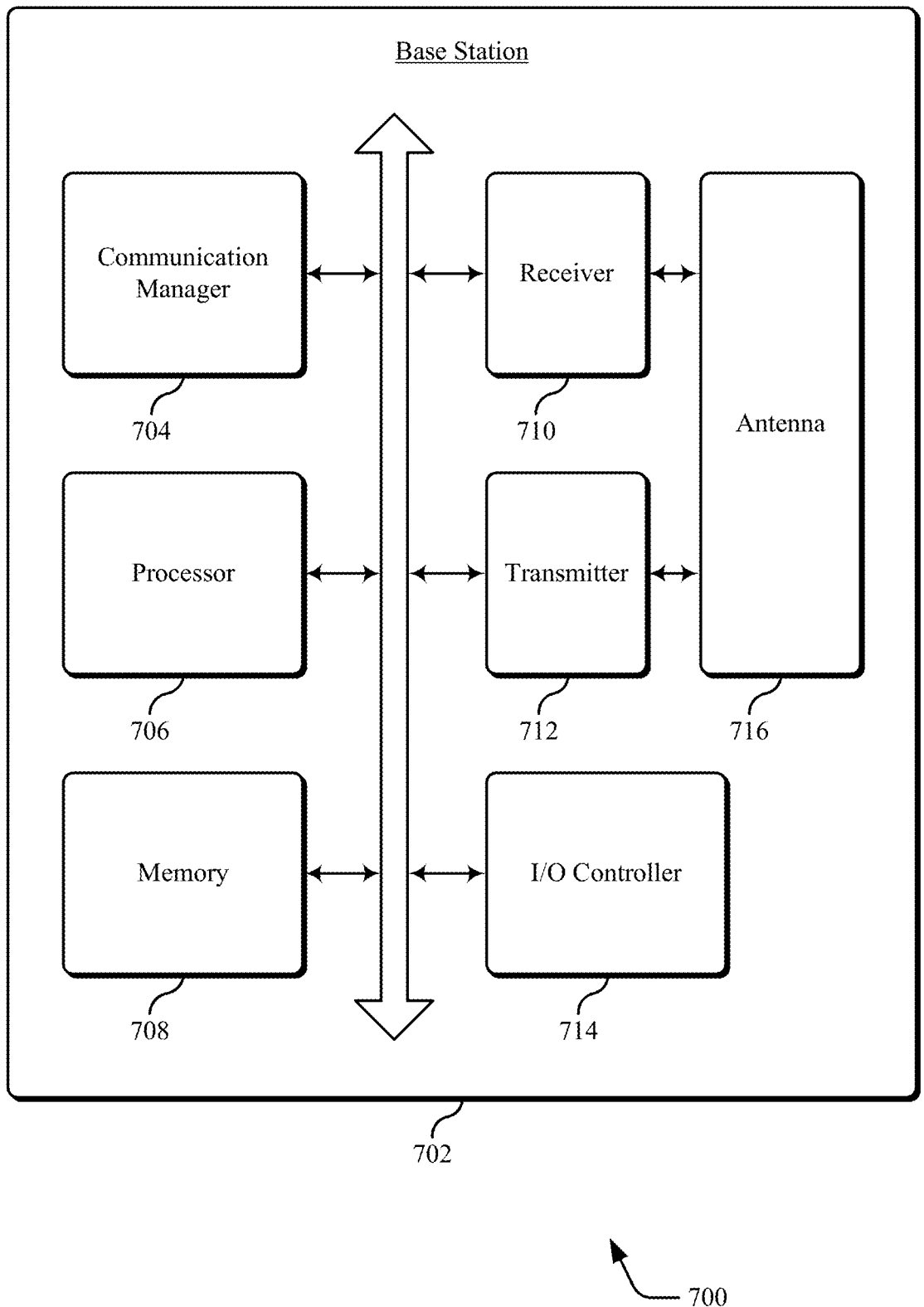
FIG. 7 illustrates an example block diagram of components of a base station that supports notification for configured grant-small data transmission action in accordance with aspects of the present disclosure.

FIG. 7 illustrates an example of a block diagram 700 of a device 702 that supports notification for configured grant-small data transmission action in accordance with aspects of the present disclosure. The device 702 may be an example of a base station 102, such as a next-generation NodeB (gNB) as described herein. The device 702 may support wireless communication with one or more base stations 102, UEs 104, or any combination thereof. The device 702 may include components for bi-directional communications including components for transmitting and receiving communications, such as a communication manager 704, a processor 706, a memory 708, a receiver 710, a transmitter 712, and an I/O controller 714. These components may be in electronic communication or otherwise coupled (e.g., operatively, communicatively, functionally, electronically, electrically) via one or more interfaces (e.g., buses).

The communication manager 704, the receiver 710, the transmitter 712, or various combinations thereof or various components thereof may be examples of means for performing various aspects of the present disclosure as described herein. For example, the communication manager 704, the receiver 710, the transmitter 712, or various combinations or components thereof may support a method for performing one or more of the functions described herein.

In some implementations, the communication manager 704, the receiver 710, the transmitter 712, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 706 and the memory 708 coupled with the processor 706 may be configured to perform one or more of the functions described herein (e.g., by executing, by the processor 706, instructions stored in the memory 708).

Additionally or alternatively, in some implementations, the communication manager 704, the receiver 710, the transmitter 712, or various combinations or components thereof may be implemented in code (e.g., as communications management software or firmware) executed by the processor 706. If implemented in code executed by the processor 706, the functions of the communication manager 704, the receiver 710, the transmitter 712, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the communication manager 704 may be configured to perform various operations (e.g., receiving, monitoring, transmitting) using or otherwise in cooperation with the receiver 710, the transmitter 712, or both. For example, the communication manager 704 may receive information from the receiver 710, send information to the transmitter 712, or be integrated in combination with the receiver 710, the transmitter 712, or both to receive information, transmit information, or perform various other operations as described herein. Although the communication manager 704 is illustrated as a separate component, in some implementations, one or more functions described with reference to the communication manager 704 may be supported by or performed by the processor 706, the memory 708, or any combination thereof. For example, the memory 708 may store code, which may include instructions executable by the processor 706 to cause the device 702 to perform various aspects of the present disclosure as described herein, or the processor 706 and the memory 708 may be otherwise configured to perform or support such operations.

For example, the communication manager 704 may support wireless communication at a first device (e.g., the base station as device 702) in accordance with examples as disclosed herein. The communication manager 704 and/or other device components may be configured as or otherwise support a means for wireless communication at a base station, including generating a notification in a form of one or more of downlink control information or a paging message, the notification including an instruction indicating to perform an action pertaining to configured grant-small data transmission functionality of a device and to stay in an inactive state; and transmitting the notification for receipt by the device while the device is in an inactive state.

Additionally, wireless communication at the base station includes any one or combination of: generating the notification as downlink control information with cyclical redundancy check information scrambled by a paging radio network temporary identifier, and configuring a short message field of the downlink control information to identify the action; generating the notification as downlink control information with cyclical redundancy check information scrambled by a paging radio network temporary identifier; configuring a short message field of the downlink control information to identify the action; and configuring the downlink control information to include one or more of a device identifier for the device or a group identifier for a group that includes the device; generating the notification as the paging message in downlink control information with cyclical redundancy check information scrambled by a paging radio network temporary identifier; and configuring the paging message to identify the action pertaining to configured grant-small data transmission functionality of the device; where the action includes one or more of to deactivate or deconfigure a configured grant configuration of the device; where the action includes an action pertaining to a timing advance timer of the device including one or more of to stop the timing advance timer, expire the timing advance timer, or invalidate the timing advance timer; where the action includes to disable the configured grant-small data transmission functionality of the device; where the device includes a component of a radio access network and the communication manager is configured to generate the notification independent of an instruction from a core network.

Additionally, a base station for wireless communication includes a communication manager to generate a notification in a form of one or more of downlink control information or a paging message, the notification including an instruction indicating to perform an action pertaining to configured grant-small data transmission functionality of a device and to stay in an inactive state; and a transceiver to transmit the notification for receipt by the device while the device is in an inactive state.

Additionally, the base station for wireless communication includes any one or combination of: where the communication manager is configured to generate the notification as downlink control information with cyclical redundancy check information scrambled by a paging radio network temporary identifier, and to configure a short message field of the downlink control information to identify the action. where the communication manager is configured to: generate the notification as downlink control information with cyclical redundancy check information scrambled by a paging radio network temporary identifier; configure a short message field of the downlink control information to identify the action; and configure the downlink control information to include one or more of a device identifier for the device or a group identifier for a group that includes the device; where the communication manager is configured to: generate the notification as the paging message in downlink control information with cyclical redundancy check information scrambled by a paging radio network temporary identifier; and configure the paging message to identify the action pertaining to configured grant-small data transmission functionality of the device; where the action includes one or more of to deactivate or deconfigure a configured grant configuration of the device; where the action includes an action pertaining to a timing advance timer of the device including one or more of to stop the timing advance timer, expire the timing advance timer, or invalidate the timing advance timer; where the action includes to disable the configured grant-small data transmission functionality of the device; where the device includes a component of a radio access network and the communication manager is configured to generate the notification independent of an instruction from a core network.

The processor 706 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 706 may be configured to operate a memory array using a memory controller. In some other implementations, a memory controller may be integrated into the processor 706. The processor 706 may be configured to execute computer-readable instructions stored in a memory (e.g., the memory 708) to cause the device 702 to perform various functions of the present disclosure.

The memory 708 may include random access memory (RAM) and read-only memory (ROM). The memory 708 may store computer-readable, computer-executable code including instructions that, when executed by the processor 706 cause the device 702 to perform various functions described herein. The code may be stored in a non-transitory computer-readable medium such as system memory or another type of memory. In some implementations, the code may not be directly executable by the processor 706 but may cause a computer (e.g., when compiled and executed) to perform functions described herein. In some implementations, the memory 708 may include, among other things, a basic I/O system (BIOS) which may control basic hardware or software operation such as the interaction with peripheral components or devices.

The I/O controller 714 may manage input and output signals for the device 702. The I/O controller 714 may also manage peripherals not integrated into the device 702. In some implementations, the I/O controller 714 may represent a physical connection or port to an external peripheral. In some implementations, the I/O controller 714 may utilize an operating system such as iOS®, ANDROID®, MS-DOS®, MS-WINDOWS®, OS/2®, UNIX®, LINUX®, or another known operating system. In some implementations, the I/O controller 714 may be implemented as part of a processor, such as the processor 706. In some implementations, a user may interact with the device 702 via the I/O controller 714 or via hardware components controlled by the I/O controller 714.

In some implementations, the device 702 may include a single antenna 716. However, in some other implementations, the device 702 may have more than one antenna 716, which may be capable of concurrently transmitting or receiving multiple wireless transmissions. The receiver 710 and the transmitter 712 may communicate bi-directionally, via the one or more antennas 716, wired, or wireless links as described herein. For example, the receiver 710 and the transmitter 712 may represent a wireless transceiver and may communicate bi-directionally with another wireless transceiver. The transceiver may also include a modem to modulate the packets, to provide the modulated packets to one or more antennas 716 for transmission, and to demodulate packets received from the one or more antennas 716.

Figure 8:
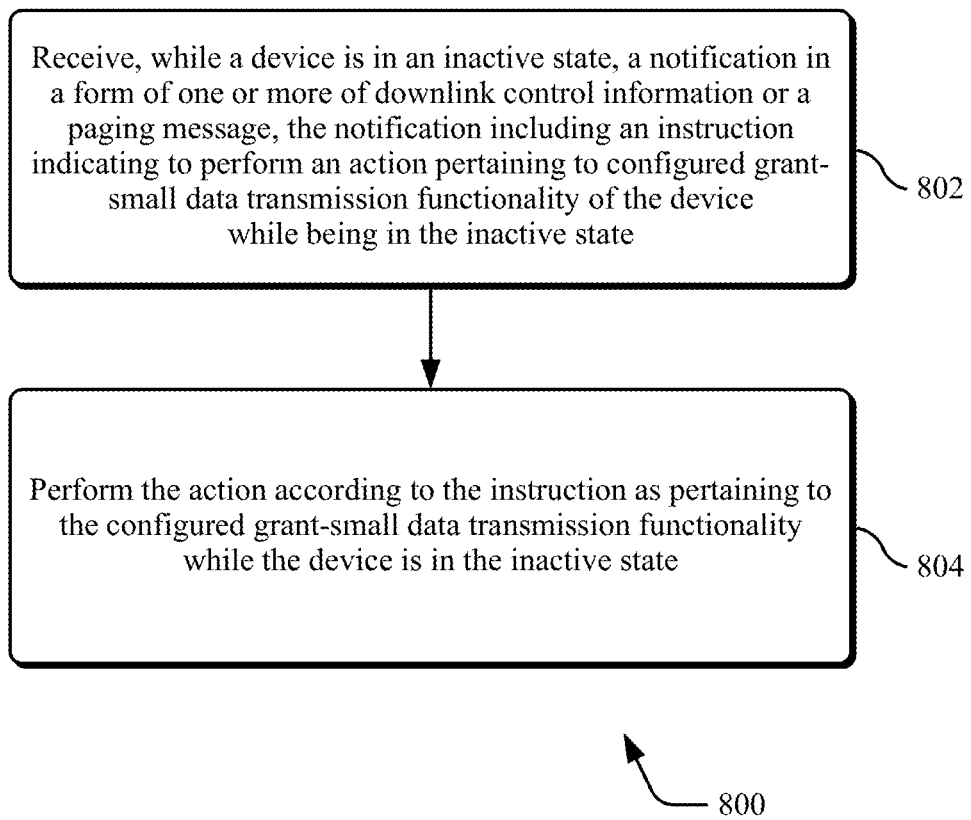
FIGS. 8-13 illustrate flowcharts of methods that support notification for configured grant-small data transmission action in accordance with aspects of the present disclosure.

FIG. 8 illustrates a flowchart of a method 800 that supports notification for configured grant-small data transmission action in accordance with aspects of the present disclosure. The operations of the method 800 may be implemented by a device or its components as described herein. For example, the operations of the method 800 may be performed by a device, such as user equipment (UE) 104 as described with reference to FIGS. 1 through 7. In some implementations, the device may execute a set of instructions to control the function elements of the device to perform the described functions. Additionally, or alternatively, the device may perform aspects of the described functions using special-purpose hardware.

At 802, the method may include receiving, while a device is in an inactive state, a notification in a form of one or more of downlink control information or a paging message, the notification including an instruction indicating to perform an action pertaining to configured grant-small data transmission functionality of the device while being in the inactive state. The instruction, for instance, indicates to perform the action pertaining to configured grant-small data transmission functionality of the device and to stay in the inactive state, e.g., without changing to a connected or idle state. Optionally, the instruction indicates to remain in the inactive state after performing the action, e.g., without transitioning to a connected or idle state The operations of 802 may be performed in accordance with examples as described herein. In some implementations, aspects of the operations of 802 may be performed by a device as described with reference to FIG. 1. Examples of different actions pertaining to configured grant-small data transmission functionality are described throughout this disclosure.

At 804, the method may include performing the action according to the instruction as pertaining to the configured grant-small data transmission functionality while the device is in the inactive state. Optionally, the device remains in the inactive state after performing the action, e.g., without transitioning to connected or idle state. The operations of 804 may be performed in accordance with examples as described herein. In some implementations, aspects of the operations of 804 may be performed by a device as described with reference to FIG. 1. In at least one implementation a UE that performs a CG-SDT action does not respond to the original notification carrying the CG-SDT action, e.g., to a base station that communicates the notification.

Figure 9:
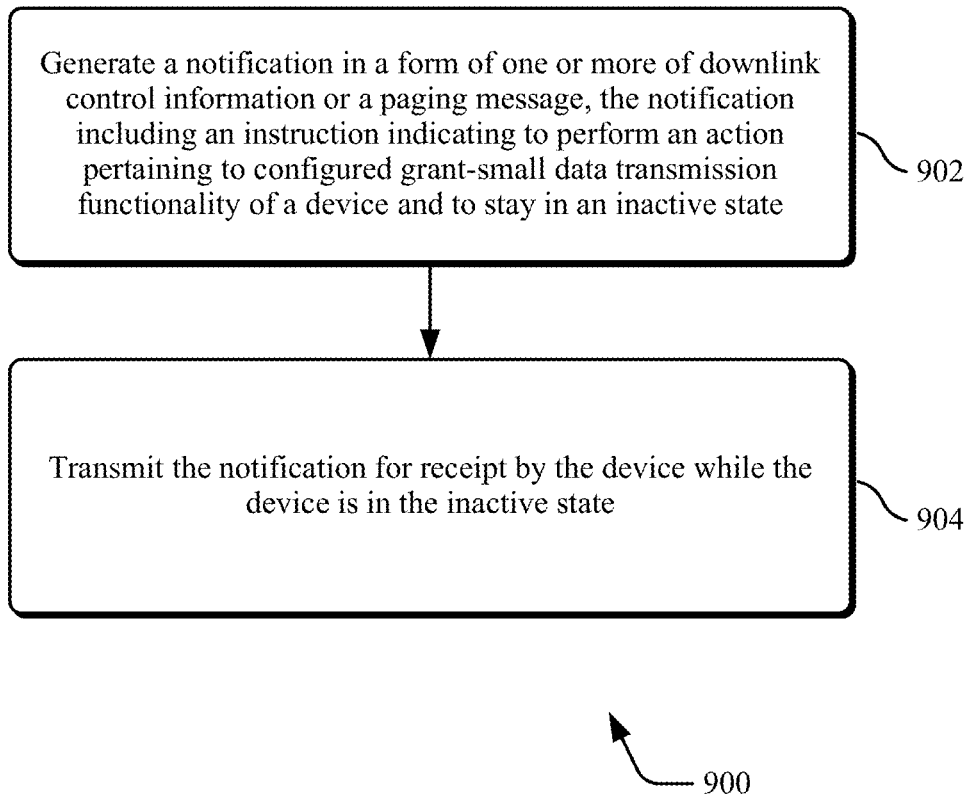

FIG. 9 illustrates a flowchart of a method 900 that supports notification for configured grant-small data transmission action in accordance with aspects of the present disclosure. The operations of the method 900 may be implemented by a device or its components as described herein. For example, the operations of the method 900 may be performed by a base station 102, such as a next-generation NodeB (gNB) as described with reference to FIGS. 1 through 7. In some implementations, the device may execute a set of instructions to control the function elements of the device to perform the described functions. Additionally, or alternatively, the device may perform aspects of the described functions using special-purpose hardware.

At 902, the method may include generating a notification in a form of one or more of downlink control information or a paging message, the notification including an instruction indicating to perform an action pertaining to configured grant-small data transmission functionality of a device while the device is in an inactive state. The operations of 902 may be performed in accordance with examples as described herein. In some implementations, aspects of the operations of 902 may be performed by a device as described with reference to FIG. 1. Examples of different actions pertaining to configured grant-small data transmission functionality are described throughout this disclosure.

At 904, the method may include transmitting the notification for receipt by the device while the device is in the inactive state. The operations of 904 may be performed in accordance with examples as described herein. In some implementations, aspects of the operations of 904 may be performed by a device as described with reference to FIG. 1.

Figure 10:
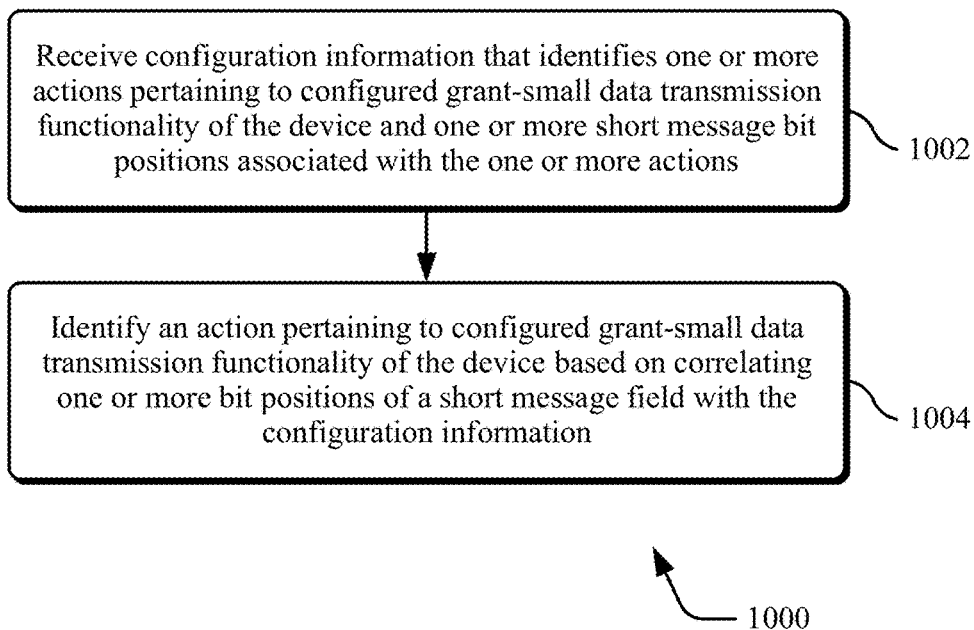

FIG. 10 illustrates a flowchart of a method 1000 that supports notification for configured grant-small data transmission action in accordance with aspects of the present disclosure. The operations of the method 1000 may be implemented by a device or its components as described herein. For example, the operations of the method 1000 may be performed by a device, such as user equipment (UE) 104 as described with reference to FIGS. 1 through 7. In some implementations, the device may execute a set of instructions to control the function elements of the device to perform the described functions. Additionally, or alternatively, the device may perform aspects of the described functions using special-purpose hardware.

At 1002, the method may include receiving configuration information that identifies one or more actions pertaining to configured grant-small data transmission functionality of a device and one or more short message bit positions associated with the one or more actions. The operations of 1002 may be performed in accordance with examples as described herein. In some implementations, aspects of the operations of 1002 may be performed by a device as described with reference to FIG. 1.

At 1004, the method may include identifying an action pertaining to configured grant-small data transmission functionality of the device based on correlating one or more bit positions of a short message field with the configuration information. The operations of 1004 may be performed in accordance with examples as described herein. In some implementations, aspects of the operations of 1004 may be performed by a device as described with reference to FIG. 1.

Figure 11:
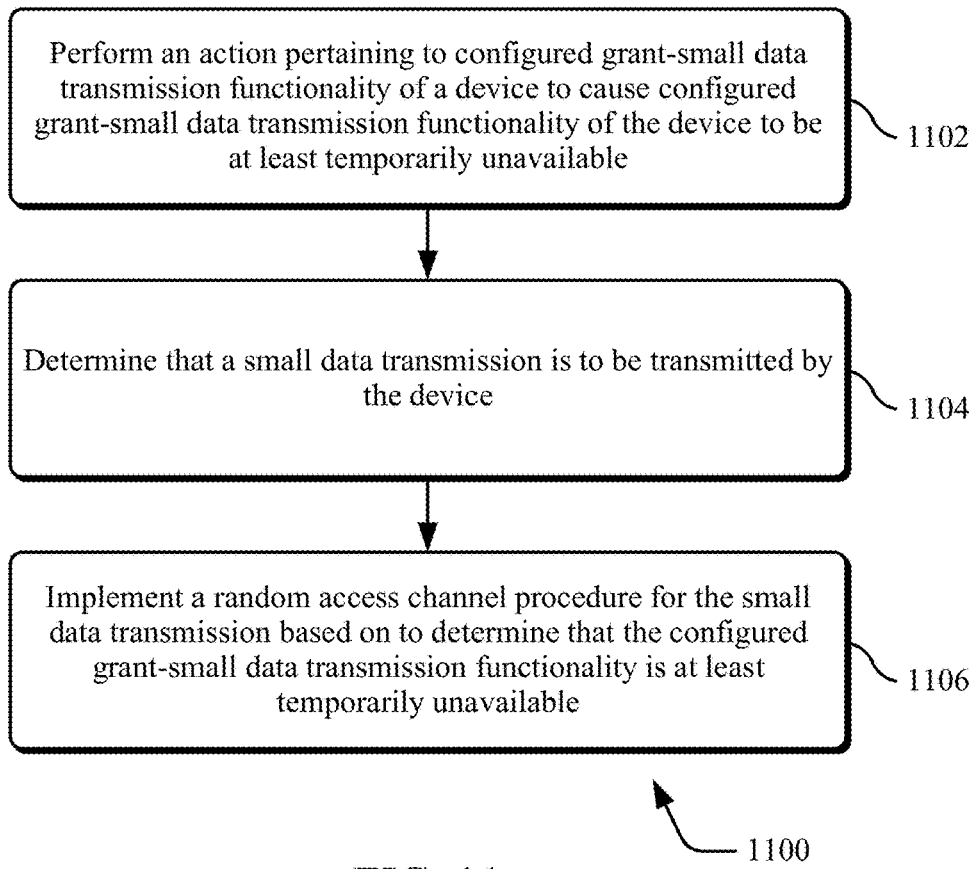

FIG. 11 illustrates a flowchart of a method 1100 that supports notification for configured grant-small data transmission action in accordance with aspects of the present disclosure. The operations of the method 1100 may be implemented by a device or its components as described herein. For example, the operations of the method 1100 may be performed by a device, such as user equipment (UE) 104 as described with reference to FIGS. 1 through 7. In some implementations, the device may execute a set of instructions to control the function elements of the device to perform the described functions. Additionally, or alternatively, the device may perform aspects of the described functions using special-purpose hardware.

At 1102, the method may include performing an action pertaining to configured grant-small data transmission functionality of a device to cause configured grant-small data transmission functionality of the device to be at least temporarily unavailable. The operations of 1102 may be performed in accordance with examples as described herein. In some implementations, aspects of the operations of 1102 may be performed by a device as described with reference to FIG. 1. A temporary unavailability may last for example until the device receives a further a notification, until a UE has received a configuration enabling a configured grant-small data transmission functionality, until a UE is (re-)starting or resetting a timing advance timer, etc.

At 1104, the method may include determining that a small data transmission is to be transmitted by the device. The operations of 1104 may be performed in accordance with examples as described herein. In some implementations, aspects of the operations of 1104 may be performed by a device as described with reference to FIG. 1.

At 1106, the method may include implementing a random access channel procedure for the small data transmission based on to determine that the configured grant-small data transmission functionality is at least temporarily unavailable. The operations of 1106 may be performed in accordance with examples as described herein. In some implementations, aspects of the operations of 1106 may be performed by a device as described with reference to FIG. 1.

Figure 12:
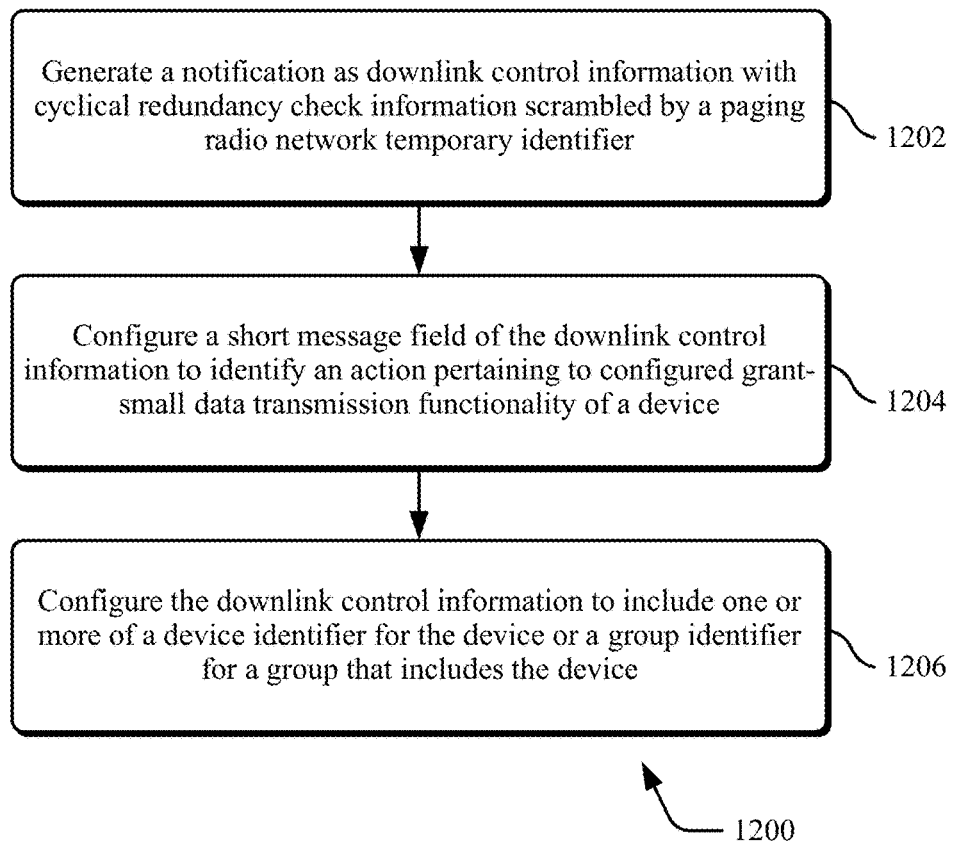

FIG. 12 illustrates a flowchart of a method 1200 that supports notification for configured grant-small data transmission action in accordance with aspects of the present disclosure. The operations of the method 1200 may be implemented by a device or its components as described herein. For example, the operations of the method 1200 may be performed by a base station 102, such as a next-generation NodeB (gNB) as described with reference to FIGS. 1 through 7. In some implementations, the device may execute a set of instructions to control the function elements of the device to perform the described functions. Additionally, or alternatively, the device may perform aspects of the described functions using special-purpose hardware.

At 1202, the method may include generating a notification as downlink control information with cyclical redundancy check information scrambled by a paging radio network temporary identifier. The operations of 1202 may be performed in accordance with examples as described herein. In some implementations, aspects of the operations of 1202 may be performed by a device as described with reference to FIG. 1.

At 1204, the method may include configuring a short message field of the downlink control information to identify an action pertaining to configured grant-small data transmission functionality of a device. The operations of 1204 may be performed in accordance with examples as described herein. In some implementations, aspects of the operations of 1204 may be performed by a device as described with reference to FIG. 1.

At 1206, the method may include configuring the downlink control information to include one or more of a device identifier for the device or a group identifier for a group that includes the device. The operations of 1206 may be performed in accordance with examples as described herein. In some implementations, aspects of the operations of 1206 may be performed by a device as described with reference to FIG. 1.

Figure 13:
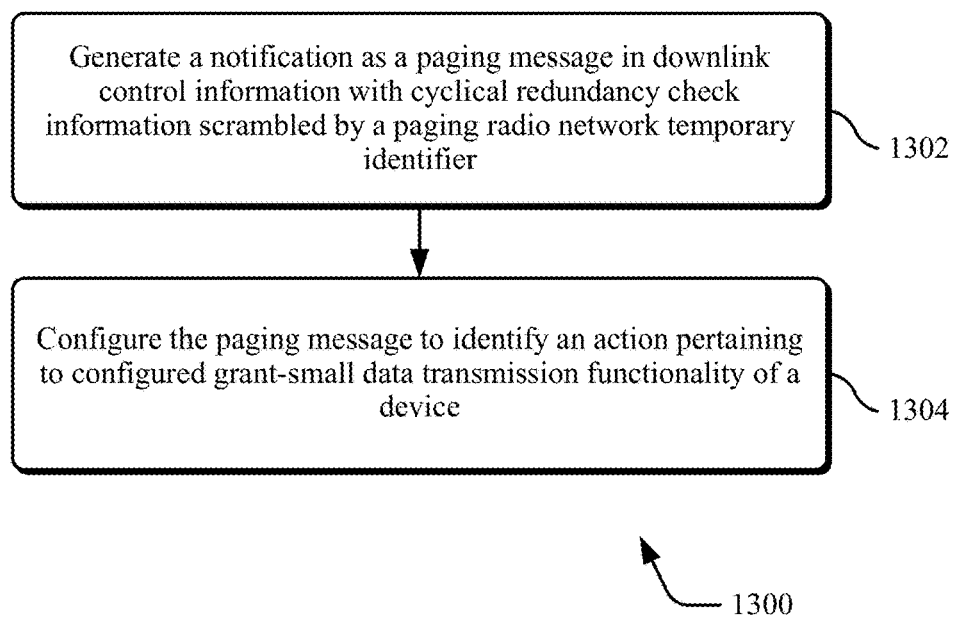

FIG. 13 illustrates a flowchart of a method 1300 that supports notification for configured grant-small data transmission action in accordance with aspects of the present disclosure. The operations of the method 1300 may be implemented by a device or its components as described herein. For example, the operations of the method 1300 may be performed by a base station 102, such as a next-generation NodeB (gNB) as described with reference to FIGS. 1 through 7. In some implementations, the device may execute a set of instructions to control the function elements of the device to perform the described functions. Additionally, or alternatively, the device may perform aspects of the described functions using special-purpose hardware.

At 1302, the method may include generating a notification as a paging message in downlink control information with cyclical redundancy check information scrambled by a paging radio network temporary identifier. The operations of 1302 may be performed in accordance with examples as described herein. In some implementations, aspects of the operations of 1302 may be performed by a device as described with reference to FIG. 1.

At 1304, the method may include configuring the paging message to identify an action pertaining to configured grant-small data transmission functionality of a device. The operations of 1304 may be performed in accordance with examples as described herein. In some implementations, aspects of the operations of 1304 may be performed by a device as described with reference to FIG. 1.

It should be noted that the methods described herein describe possible implementations, and that the operations and the steps may be rearranged or otherwise modified and that other implementations are possible. Further, aspects from two or more of the methods may be combined. The order in which the methods are described is not intended to be construed as a limitation, and any number or combination of the described method operations can be performed in any order to perform a method, or an alternate method.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on. Further, as used herein, including in the claims, a "set" may include one or more elements.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described example.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method performed by a user equipment (UE), the method comprising:
    receiving configuration information, the configuration information indicating a mapping of one or more actions pertaining to configured grant-small data transmission functionality of the UE to respective short message bit positions;
    receiving, while the UE is in an inactive state, a notification in a form of downlink control information with a short message field including one or more bits, the notification including an instruction indicating to perform an action of the one or more actions pertaining to the configured grant-small data transmission functionality of the UE;
    identifying, using the mapping of the one or more actions pertaining to the configured grant-small data transmission functionality of the UE to the respective short message bit positions, the action from at least one short message bit position of the one or more bits; and
    performing the action according to the instruction as pertaining to the configured grant-small data transmission functionality while the UE is in the inactive state.

2. The method of claim 1, wherein the downlink control information includes cyclical redundancy check information scrambled by a paging radio network temporary identifier.

3. The method of claim 1, wherein the downlink control information includes one or more of a device identifier for the UE or a group identifier for a group that includes the UE.

4. The method of claim 1, wherein the action comprises one or more of deactivating or deconfiguring a configured grant configuration of the UE.

5. The method of claim 1, wherein the action includes one or more of stopping a timing advance timer, expiring the timing advance timer, or invalidating the timing advance timer.

6. The method of claim 1, wherein the action comprises disabling the configured grant-small data transmission functionality of the UE.

7. The method of claim 1, wherein receiving the configuration information comprises:
    receiving control signaling activating the configured grant-small data transmission functionality of the UE, the control signaling comprising the configuration information.

8. The method of claim 1, further comprising:
    receiving, after performing the action, second configuration information, the second configuration information indicating a second mapping of the one or more actions pertaining to the configured grant-small data transmission functionality of the UE to second respective short message bit positions.

9. A user equipment (UE) for wireless communication, comprising:
    at least one memory; and
    at least one processor coupled with the at least one memory and configured to cause the UE to:
        receive configuration information, the configuration information indicating a mapping of one or more actions pertaining to configured grant-small data transmission functionality of the UE to respective short message bit positions;
        receive, while the UE is in an inactive state, a notification in a form of downlink control information with a short message field including one or more bits, the notification including an instruction indicating to perform an action of the one or more actions pertaining to the configured grant-small data transmission functionality of the UE;
        identify, using the mapping of the one or more actions pertaining to the configured grant-small data transmission functionality of the UE to the respective short message bit positions, the action from at least one short message bit position of the one or more bits; and
        perform the action according to the instruction as pertaining to the configured grant-small data transmission functionality while the UE is in the inactive state.

10. The UE of claim 9, wherein the downlink control information includes cyclical redundancy check information scrambled by a paging radio network temporary identifier.

11. The UE of claim 9, wherein to perform the action, the at least one processor is configured to cause the UE to:
    determine that a small data transmission is to be transmitted by the UE; and
    implement a random access channel procedure for the small data transmission to determine that the configured grant-small data transmission functionality is at least temporarily unavailable.

12. The UE of claim 9, wherein to receive the configuration information, the at least one processor is configured to cause the UE to:
    receive control signaling activating the configured grant-small data transmission functionality of the UE, the control signaling comprising the configuration information.

13. A base station for wireless communication, comprising:
    at least one memory; and
    at least one processor coupled with the at least one memory and configured to cause the base station to:
        generate configuration information, the configuration information indicating a mapping one or more actions pertaining to configured grant-small data transmission functionality of a user equipment (UE) to respective short message bit positions;

transmit the configuration information for receipt by the UE;

generate a notification in a form of downlink control information with a short message field including one or more bits, the notification including an instruction indicating to perform an action of the one or more actions pertaining to the configured grant-small data transmission functionality of the UE while the UE is in an inactive state; and transmit the notification for receipt by the UE while the UE is in the inactive state.

14. The base station of claim 13, wherein the downlink control information includes cyclical redundancy check information scrambled by a paging radio network temporary identifier.

15. The base station of claim 13, wherein the downlink control information includes one or more of a device identifier for the UE or a group identifier for a group that includes the UE.

16. The base station of claim 13, wherein the action comprises one or more of to deactivate or deconfigure a configured grant configuration of the UE.

17. The base station of claim 13, wherein the action includes one or more of to stop a timing advance timer, expire the timing advance timer, or invalidate the timing advance timer.

18. The base station of claim 13, wherein the action comprises to disable the configured grant-small data transmission functionality of the UE.

19. The base station of claim 13, wherein the base station includes a component of a radio access network, the at least one processor configured to cause the base station to generate the notification independent of an instruction from a core network.

20. A processor for wireless communication, comprising:

at least one controller coupled with at least one memory and configured to cause the processor to:

receive configuration information, the configuration information indicating a mapping of one or more actions pertaining to configured grant-small data transmission functionality of the processor to respective short message bit positions;

receive a notification in a form of downlink control information a short message field including one or more bits, the notification including an instruction indicating to perform an action of the one or more actions pertaining to the configured grant-small data transmission functionality of a device while the device is in an inactive state;

identify, using the mapping of the one or more actions pertaining to the configured grant-small data transmission functionality of the processor to the respective short message bit positions, the action from at least one short message bit position of the one or more bits; and perform the action according to the instruction as pertaining to the configured grant-small data transmission functionality while the processor is in the inactive state.

\* \* \* \* \*